United States Patent [19]

Benton et al.

[11] 3,781,016

[45] Dec. 25, 1973

[54] CASSETTE PLAYER

[75] Inventors: Kenneth E. Benton, Broomfield; Vincent L. Jacques, Longmont, both of Colo.

[73] Assignee: International Business Machines Corporation, Armonk, N.Y.

[22] Filed: Mar. 10, 1971

[21] Appl. No.: 122,890

[52] U.S. Cl. .......... 274/4 C

[51] Int. Cl. .......... G11b 5/00

[58] Field of Search ...... 242/198–200; 274/4 C, 4 E, 274/4 G, 4 B, 11 B, 11 C; 179/100.2 Z

[56] References Cited

UNITED STATES PATENTS

| | | | |
|---|---|---|---|
| 3,635,423 | 1/1972 | Lennie | 242/198 |
| 3,495,835 | 2/1970 | Laa | 274/4 E |
| 3,419,226 | 12/1968 | Sato | 274/4 E |
| 3,603,595 | 9/1971 | Wada | 274/4 E |
| 3,492,005 | 1/1970 | Ueno | 274/4 B |
| 2,572,596 | 10/1951 | Camras | 179/100.2 Z |
| 3,598,339 | 10/1971 | Saito | 274/4 E |
| 3,591,267 | 7/1971 | Kakiuchi | 274/4 A |

FOREIGN PATENTS OR APPLICATIONS

| | | | |
|---|---|---|---|
| 32,265 | 12/1969 | Japan | 274/4 E |
| 27,029 | 9/1970 | Japan | 274/4 E |

*Primary Examiner*—Harry N. Haroian
*Attorney*—Hanifin & Jancin and Herbert F. Somermeyer

[57] ABSTRACT

A cassette is loaded and ejected by a single-action mechanism. In loading, insertion of the cassette into the cassette player substantially simultaneously cocks the ejection mechanism, actuates a cassette holddown mechanism, and moves the pinch roller and transducer into a tape-operating relationship. A single-action release mechanism, such as a push button, substantially simultaneously moves the transducer and pinch roller out of operative engagement with the tape in the cassette and releases and ejects the cassette.

30 Claims, 5 Drawing Figures

PATENTED DEC 25 1973

3,781,016

INVENTORS

KENNETH E. BENTON
VINCENT L. JACQUES

BY

Herbert F. Smeemayer

ATTORNEY

CASSETTE PLAYER

BACKGROUND OF THE INVENTION

The present invention relates to magnetic tape cassette players and the like and particularly to such players having a single-action cassette receiver and ejection mechanism.

Cassette magnetic tape players and cassette motion picture devices are receiving increased popularity in the audio, pictorial, and digital fields. There have been a multitude of different variations of cassette players. Many of them load the cassette broadside; i.e., the cassette is moved parallel to the axis of rotation of the spools in the cassette while others are loaded in one or more motions which include moving the cassette perpendicular to such axes such that the tape or film in the cassette is moved against a relatively stationary operating member such as a transducer, lens, pinch roller, and the like. An advantage of the broadside load is the short loading stroke required. This makes a cassette player more amenable to automation—that is, in the automatic loading and unloading of a cassette from a plurality of cassettes in a storage array or belt, a short loading stroke simplifies constructional features in the cassette as well as in the loading and unloading mechanisms. It also facilitates operator insertion of the cassette. A disadvantage of the end-on loading is that either the cassette must be moved in two planes of motion or the spindles must move to engage the reels within the cassette. In either event, the loading or the cassette player mechanisms become complex and hence more expensive than is necessary.

In many of the prior cassette machines, the insertion of the cassette cocks or actuates a mechanism which later, when released, automatically or semiautomatically ejected the cartridge. Cassette insertion in the prior machines was able to perform only a small number of functions. Many of the cassette-insertion actuated mechanisms are associated with the end-loading cassette players. In such an arrangement, the transducer and the pinch roller were relatively fixed with the cassette moving into operating engagement therewith. As mentioned above, this has disadvantages when one wants to adapt the cassette player in a fully automatic machine—that is, the long stroke required for end-on loading may complicate the automatic mechanisms.

Other machines of simple design permitted a broadside load by pivoting the cassette as it was inserted into playing position. This is fine for operator insertion; however, if the cassette player were ever to be considered for automatic machines, then this complex loading device could complicate the loading and unloading mechanism as well as possibly reduce the reliability of same—that is, when moving the cassette to and from an operating position in the player, the possibility of jamming the cassette in the inoperative position may be high.

Many cassette players have had movable cassette holders. The cassette is placed in the holder, and the cassette within the holder is moved into an operating position. This arrangement permits the spindles and the transducers to be relatively fixed. However, the cost of the movable holder is added to a mechanism having a complex loading/unloading stroke.

Other cassette players have had parallelogram type of linkages requiring several movements and parts for loading the cassette and latching the cassette in an operating position. With increasing competition in the cassette-player area, it is extremely important that the reliability of the cassette player be enhanced while at the same time reducing the complexity and hence the cost, but yet provide a great deal of flexibility—that is, a cassette player, especially in the digital field, should be amenable to either operator insertion or automatic insertion of the cartridge. Such a desire dictates that the loading/unloading stroke be as simple and short as possible.

SUMMARY OF THE INVENTION

It is an object of the present invention to provide a simple single stroke load/unload mechanism for a cassette player.

A cassette player constructed in accordance with the present invention preferably permits the cassette to be loaded in a broadside manner. An interlinking mechanism coordinates action between movements of a transducer, a pinch roller (either of which may be considered as an operating member and only one of which may be actuated in accordance with the invention), a cassette engaging member and ejector, and a cassette holddown such that as the cassette is loaded, all of the members are moved into operating position as the cassette is inserted—that is, the holddown mechanisms engage the cassette for retaining it in an operating position, the ejection mechanism is cocked for permitting cassette ejection after suitable actuation, and the pinch roller and transducer are moved into operating engagement. The cassette player may include a single spring means operatively connected to one of the linkage mechanisms for urging the mechanisms to either an ejected or operating position.

In one version of the invention, a main pivot member is disposed within the player. Main pivot member provides mechanical linkage connections between all of the above-stated members and, by single reversible pivoting action, moves all of said members between operating and cassette-ejected positions. For movements between the ejected and operating positions, the ejection member is actuated by the cassette to move to a first position, which movement actuates the main pivot member which then actuates the other members. In moving from the operating to the ejected position, an actuating device such as a manually actuated push button operatively connects to the main pivot member for pivoting same and thereby causing all of said parts to move to an ejected position. All actions, either ejection or loading, are single-stroke motions.

In a more detailed version of the invention, lost motion means are provided between those parts operating with the cassette tape and those parts for ejecting or holding down the tape such that the operating members with the tape are moved into operating engagement only after the cassette has been substantially inserted into the operating position and, when being ejected, the operating members are moved from the engaging position substantially before the cassette leaves such an operating position.

Unique holddown means are provided. The player is provided with a pair of apertures on opposite sides of the cassette-receiving platform. A pair of resilient outwardly biased cassette-retaining members are movably disposed through the apertures and include inwardly projecting catch means for releasably holding the cassette in the operating position. The retaining members may also include outwardly facing camming surfaces which operatively engage the main frame of the player for camming the retaining members into engagement with the cassette when it is in an operating position. The retaining members are yieldably biased outwardly to disengage from the cassette during cassette ejection. The cassette-ejection mechanism may include a horizontal platform integrally associated with the cassette-retaining members such that the movements of the retaining members and of the ejection members are simultaneous.

The foregoing and other objects, features, and advantages of the invention will be apparent from the following more particular description of preferred embodiments of the invention, as illustrated in the accompanying drawings.

THE DRAWINGS

DETAILED DESCRIPTION

Figure 1:
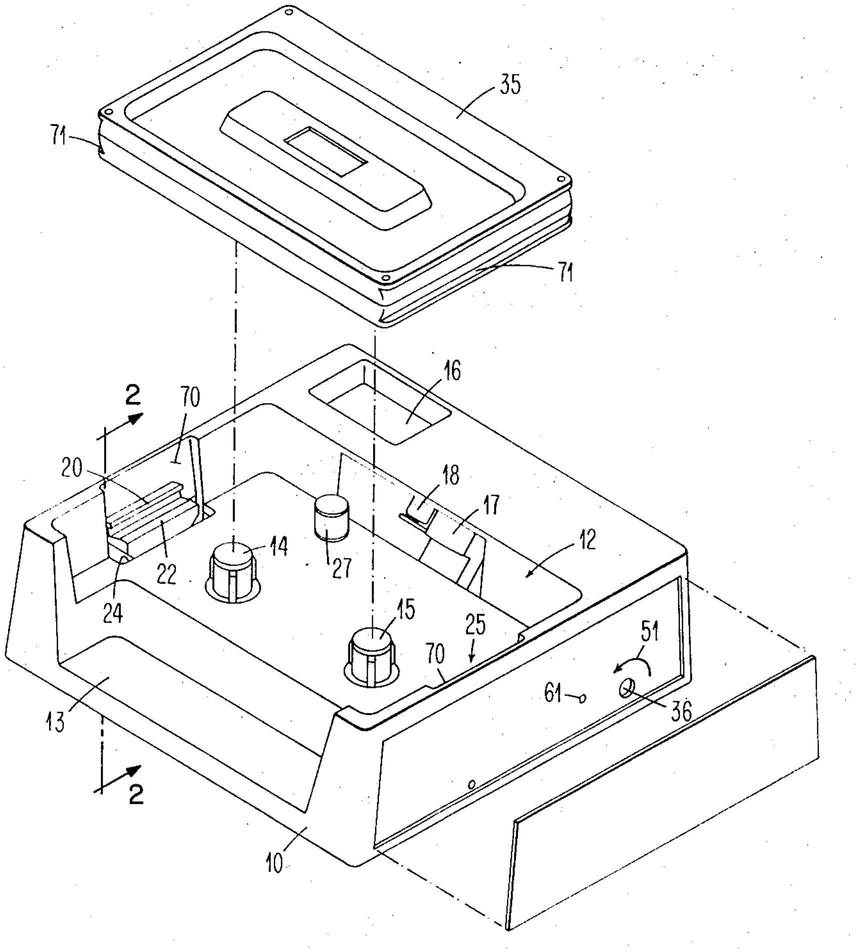
FIG. 1 is a simplified isometric view of a cassette player using the present invention with one side wall removed for showing shaft mountings and a cassette in an insertable position above the cassette receiving well of the player.

Referring now more particularly to the drawings, like numbers and characters indicate like parts and structural features in the various views. The cassette player used to illustrate the principles of the present invention has housing 10 also being the frame. Housing 10 has cassette-receiving well 12 with a front opening with hand-receiving recess 13 to facilitate removal of a cassette ejected from an operating position but still within well 12. A pair of spool spindles 14 and 15 slidably receive the hubs of the spools within the cassette to be used with the player and then drive the spools, respectively. Push button 16 is depressed for moving transducer 17 and pinch roller 18 from tape-engaging relationship with a tape in the cassette and substantially simultaneously releases the holddown mechanisms 20 and 21 and ejects the cartridge 35 by moving cassette engaging and ejection members 22 and 23 upwardly through apertures 24 and 25 in well 12. Holddown members and ejection members on each side of the well are integrally formed as shown, no limitation thereto intended. Ejection members can also be placed in the center of the well with a pair of pivoting arms (not shown) connecting the ejection members to the holddown members for providing coordinated action.

Insertion of cassette 35 over spindles 14 and 15 engages the ejection members 22 and 23 for moving all of the members 17, 18, 20, and 21 into an operating position. Depression of push button 16 moves all of the members 17, 18, 20, 21, 22, and 23 to a cartridge-ejected or loading position.

The illustrated cassette player is adapted to operate with a tape-containing cassette having a pair of coplanar reels with spindle-receiving hubs and a tape-opening window for permitting operative engagement between tape and transducer 17, pinch roller 18, and rotatable capstan 27. Pinch roller 18 is movable to push tape against capstan 27. A spool drive means (not shown nor described) rotates the drive spindles 14 and 15 in coordinated action, while rotating capstan 27 for moving the tape between the two spools (not shown). Signal-processing circuits (not shown) are electrically connected to transducer 17 for transducing operations with magnetic tape (not shown) in a cassette.

In a preferred form of the invention, all the linkages used in connection with the present invention are interconnected by main pivot member 36. Member 36 is pivoted about an axis running along the length thereof and disposed below and rearwardly of cartridge-receiving well 12. The use of main pivot member 36 facilitates simplification of the linkages; however, it is not absolutely necessary to have a single main pivot member connecting all the linkages in order to successfully practice the broader aspects of the present invention.

One of the critical relationships in cassette insertion and ejection is the relationship of pinch roller 18 and transducer 17 with respect to tape in cassette 35. That is, if the cassette moves axially with respect to spindles 14 and 15 while transducer 17 and pinch roller 18 are still engaged, the tape will be damaged. Accordingly, lost motion means are interposed between second linkage means 38 and first linkage means 37 such that pinch roller 18 and transducer 17 do not engage tape in cassette 35 until after the cassette has been substantially fully inserted. Second linkage means 38 operatively connects main pivot member 36 to a pair of cassette-ejection and holddown members 20–23. In the direction of motion from the operating position to ejection, later described lost motion is provided between second linkage means 38 and main pivot member 36 such that the last action occurring is the ejection of the cassette for permitting the transducer 17 and pinch roller 18 to be moved from tape-engaging position. Finally, third linkage means 39 connects main pivot member to push button or cassette-ejection actuating member 16. The third linkage means is spring urged toward the operative position ready for effecting a cassette ejection.

The action of the interconnecting linkages responsive to cassette insertion for performing all operations in response thereto in one action is first described. Then, the reverse actuation by depression of push button 16 is described showing the single-action ejection and movement of all linkages from the operating position to an ejection or loading position.

The mechanism, when in the loading position, includes ejection members 22 and 23 being at the upwardmost portion of their vertical travel, transducer 17 and pinch roller 18 in retracted positions, and holddown members 20 and 21 in an outward cassette-releasing position. Insertion of cassette 35 into cassette-receiving well 12 first engages spindles 14 and 15 for guiding cassette 35 to engage upward-facing ejection members 22 and 23.

During cassette loading, members 20–23 are first urged downwardly to actuate second linkage means 38. After lost motion in second linkage means 38, main pivot member 36 is released; then spring actuated by the third linkage means 39 and, after lost motion, moves transducer 17 and pinch roller 18 into tape-operating position. Transducer 17 and pinch roller 18 are referred to as an operating member. In other embodiments of the present invention, the transducer and pinch roller may be separately mounted; and only one or the other may be moved into operating position in accordance with the invention. In some tape transports, the operating member may only be a transducer. For example, in a reel-to-reel transport, there is no capstan and, therefore, no need for a pinch roller. Also, the spring urging may be supplied at various points in the linkages.

For ejection, actuating push button 16 moves third linkage means 39 for pivoting main pivot member 36. First linkage means moves transducer 17 and pinch roller 18 into a tape-disengaged position. The lost motion of main pivot member 36 allows tape transducer 17 and pinch roller 18 to be disengaged before actuating second linkage means 38 to release and eject cassette 35.

From the above description, it is seen that the linkages have lost motion in both directions of actuation. Such lost motion simplifies construction of the linkages to provide the desirable relationship of motion between transducer 17 and pinch roller 18 and cassette 35 motions during loading and unloading. This lost motion is included in a single-stroke operating mechanism providing single-action cassette loading and ejection.

Figures 4, 5:
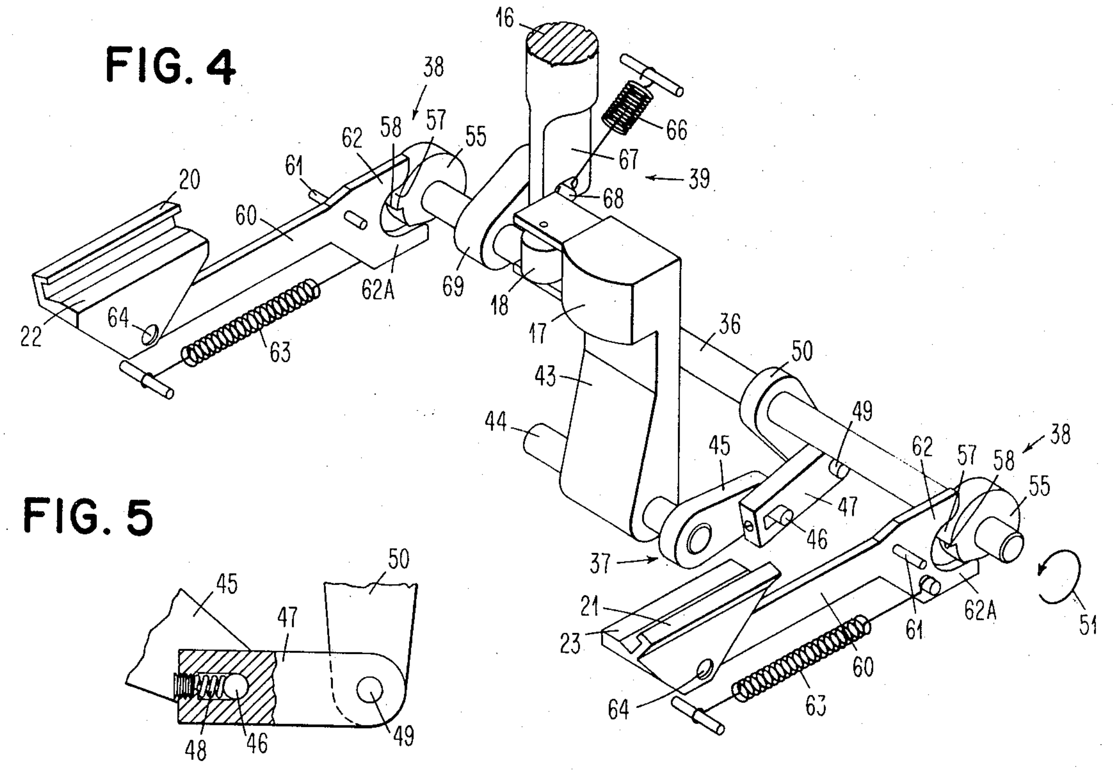
FIG. 5 is a simplified partial view of a mechanical linkage connection used to couple the tape operating members to the main pivot member.

First linkage means 37 includes pivoted mounting lever 43 securely mounting pinch roller 18 and transducer 17. Electrical connections are not shown for simplicity. Secondary pivot rod 44 supports lever 43 for pivoting in a bearing in housing 10. The axes of pivoting for members 44 and 36 are parallel. Secondary operating arm 45 is secured on one axial-end portion of secondary or auxiliary pivot member 44. It has pin 46 extending parallel to member 44 and operatively engaging connecting rod 47 in an elongated aperture (FIG. 5). Spring 48 resiliently holds pin 46 against one end of the elongated aperture. Connecting rod 47 operatively connects secondary operating arm 45 to main operating arm 50 securely mounted on main pivot member 36. Main connecting pin 49 connects rod 47 to the radial outward end of arm 50. During a loading operation, main pivot member 36 is rotated in the direction of arrow 51. First linkage means 37, including connecting rod 47, moves the secondary or auxiliary pivot member 44 in the same direction for moving transducer or head 17 into operative engagement with the tape in cassette 35. Upon release, depression of push button 16 pivots main pivot member 36 in a sense opposite to that indicated by arrow 51 and, hence, parallel disposed secondary pivot member 44 in the same opposite sense moving transducer 17 from the tape in cassette 35. The latter is a first action occurring during release and ejection of a cassette from the illustrated player.

Second linkage means 38 consists of two independent, but coacting, linkages connecting main pivot member 36 to a pair of spaced-apart, combined, holddown-ejector members 20–23. Since both linkages are identically constructed and operate in the same manner, the same numbers are used to indicate corresponding parts in the two portions of the second linkage means. Each portion respectively is responsive to cassette insertion and respectively ejects opposite ends of cassette 35. Cams 55 are secured at opposite axial ends of main pivot member 36. Each cam has kick-out shoulder 56, a dwell radius cam surface 57 (for providing lost motion), and release shoulder 58. Elongated pivot arms 60 are pivotally secured to housing 10 at 61. Each arm 60 has a cam follower portion 62 in operative engagement with a cam 55. In the ejected/loading position, cam follower portion 62 engages shoulder 58 locking the entire mechanism in that position. The spring 66 urging in third linkage means 37 urges shoulder 58 against portion 62. Dwell surface 57 has an increasing radius from a minimum at shoulder 58 toward shoulder 56. This increasing radius is used to lock the mechanism in the operating position shown in FIG. 4, as will be explained.

Figure 3:
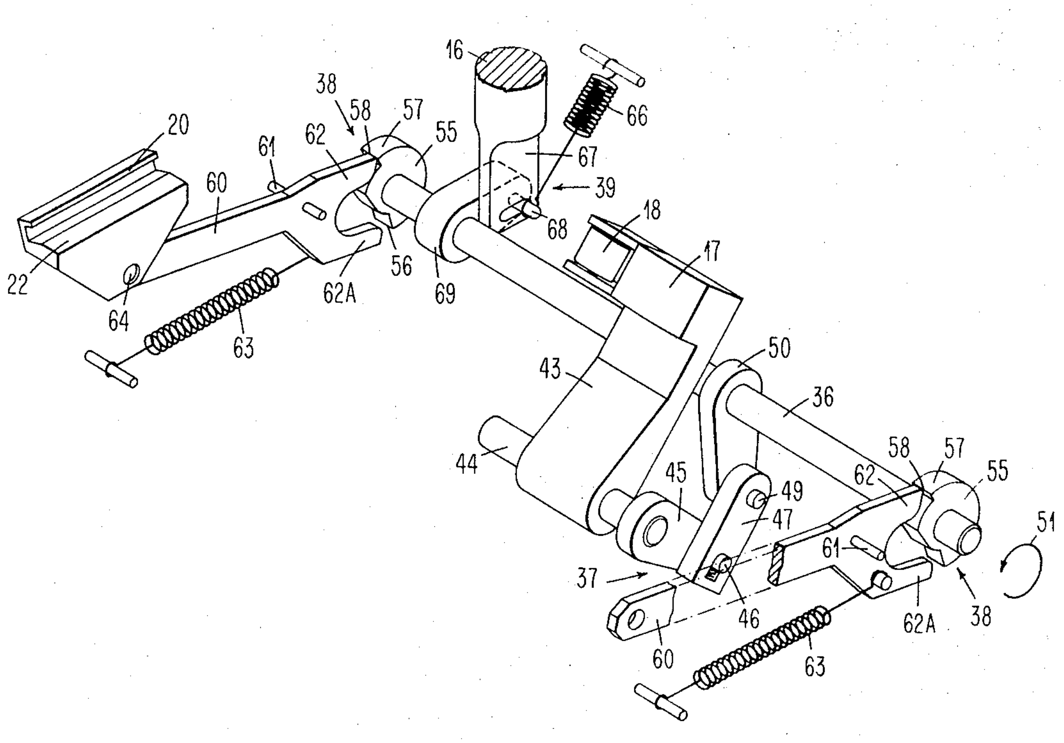
FIGS. 3 and 4 are simplified isometric views of the load/eject mechanism used in the FIG. 1 illustrated player respectively in the cartridge ejected and operating positions.

During loading of cassette 35, elongated arm 60 is pivoted (counter clockwise as seen in FIGS. 3 and 4) about 61 permitting cam follower 62 to pivot over dwell radius 57 (cam 55 is rotating counter clockwise under spring urging). Lost motion between cassette insertion and head 18 pivoting is provided by elongated members 60 pivoting to the top of release shoulders 58. Then, main pivot member 36 pivots in the direction of arrow 51 to move transducer 17 and pinch roller 18 into operative engagement with tape in cassette 35. When in this operating position, elongated arms 60 are held against pivoting action by cam surface 57 and cam follower 62 being in an interference engagement at the increased radius as seen in FIG. 4.

Figure 2:
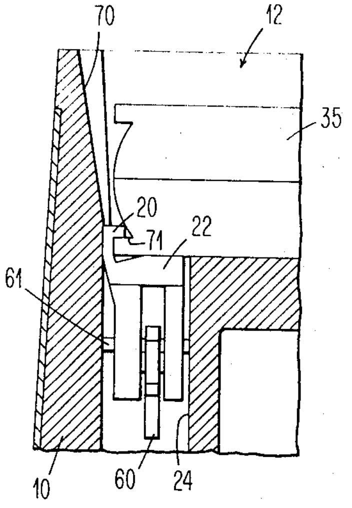
FIG. 2 is an enlarged partial sectional view taken in the direction of the arrows along line 2—2 in FIG. 1 for showing camming action between the player housing and cassette holddown members.

During cassette insertion, cassette 35 rides on ejection members 22 and 23. During that downward motion, holddown members 20 and 21 are cammed inwardly by cam surfaces 70 (best seen in FIG. 2) to engage cassette 35 holddown shoulders 71, respectively. Also, cam followers 62 ride over release shoulders 58 and thence over dwell radius 57 to the position shown in FIG. 4. Both arms 60 must pivot such that both cam follower portions 62 ride over release shoulders 58 before main pivot member 36 pivots. This action requires proper cassette insertion before transducer 17 and pinch roller 18 are pivoted to their respective operating positions. Upon engagement of detent shoulders 56 by portions 62, there is a solid linkage between ejection members 22 and 23 and the remainder of the mechanism for locking same against inadvertent ejection.

For ejection of cassette 35, depression of push button 16 pivots member 36 and cams 55 in a sense opposite to that of arrow 51. Kick-out shoulders 56 respectively engage lower tines 62A for releasing cam followers 62 from their respective interference bits. Depression of push button 16 pivots member 36 and cam 55 clockwise. Cam followers 62 ride over dwell radius 57. This action provides lost motion between pivoting head 18 from tape engagement to cassette ejection. When both cam followers 62 reach release shoulders 58, arms 60 pivot under the force of extension springs 63, moving ejection members 22 and 23 upwardly to eject cassette 35. Members 22 and 23 are pivotally secured to arms 60 respectively at pivot points 64. As the ejection members 22 and 23 move upwardly ejecting cassette 35, the holddown members 20 and 21, which are resiliently urged outwardly, ride on cam surface 70 (FIG. 2) releasing cassette 35 for ejection. Releasing push button 16 enables the third linkage means spring urging to pivot cams 55 release shoulders 58 against portions 62 ready for a cassette insertion. Note that if one of the cam followers 62 reaches its release shoulder 58 before the other, cassette 35 is not ejected until both cam followers 62 are released.

Third linkage means 39 connects push button 16 to main pivot member 36. Spring 66 urges push button 16 upwardly towards the operative position. Push button 16 is mounted for reciprocating motion on reciprocating rod 67. Eccentric pin 68 is movably disposed in an elongated slot within member 67 and is secured to the radial outward end portion of eccentric arm 69. Arm 69 is securely mounted on main pivot member 36. During cartridge insertion, main pivot member 36 pivots in the direction of arrow 51 under spring 66 urging through eccentric arm 69, thereby allowing push button 16 to move upwardly into the operating position ready for ejection actuation. Upon depression of push button 16, spring 66 urging is overridden to pivot eccentric arm 69 and hence main pivot member 36 in a sense opposite to the direction of arrow 51. This action first moves transducer 17 and pinch roller 18 into a tape-disengaged (loading) position and then, after cam followers 62 have reached release shoulder 58, quickly ejects cassette 35 from cassette-receiving well 12.

In the described cassette ejection, a pair of springs 63 actuate pivot arms 60 for ejecting cassette 35. It is understood that by suitably connecting two pivot members one spring may be provided in the place of two. Alternatively, within the scope of the present invention, other linkage configurations may be provided with a single spring connected to one of them for actuating cassette ejection. In another arrangement, cams 55 can be redesigned such that depression of push button 16 positively ejects the cassette with an extension or other form of spring being used to move the actuating mechanism into an operating detented position in response to a cassette moving the ejection members 22 and 23 downwardly. Other spring-actuated mechanisms may be designed using the principles set forth in this specification.

Returning briefly to the first linkage means, it is seen that both transducer 17 and pinch roller 18 are mounted on mounting arm 43 for simultaneous pivoting movement to and from the tape. It is understood that transducer 17 and pinch roller 18 may be separately mounted. In other words, two sets of first linkage may be provided—one for transducer 17 and one for pinch roller 18. These two linkages may be designed such that transducer 17 is first moved from tape-engaging relationship and then pinch roller 18 is moved. Following this, cassette 35 is ejected. By providing a detent in push button 16 in third linkage means 39, a partial depression moves transducer 17 from the tape-engaging position. This facilitates high-speed rewind in that transducer 17 is disengaged from the tape. Lost motion can be provided between such actuating linkage and pinch roller 18.

It is understood that push button 16 may be replaced by an electrical solenoid, pneumatic actuator, or the like. Alternatively, the linkages from main pivot member 36, transducer 17, and pinch roller 18 may have the same motion during cassette ejection. However, a supplementary pivoting actuator may be provided for transducer 17 such that it may be moved out of tape-engaging relationship without moving main pivot member 36. In this regard, overtravel is provided in the first linkage means to transducer 17.

Main pivot member 36 is disposed below and rearwardly of cassette-receiving well 12. It has a pivoting axis along its length disposed in somewhat parallel relationship to the direction of tape travel past the operating members, transducer 17, and pinch roller 18. This provides for a compact arrangement beneath the tape deck. Alternatively, a short axial length main pivot member may be provided having an axis of rotation perpendicular thereto with a set of connecting rods providing similar actions as described herein including lost motion and positive connections between the various mechanisms and still preserve the single-stroke, single-action cassette insertion and ejection functions. In such arrangements, it is advantageous to have all pivot axes parallel. Accordingly, member 43 would be pivoted about a vertical axis rather than a horizontal axis, as shown in FIGS. 3 and 4.

While the invention has been particularly shown and described with reference to preferred embodiments thereof, it will be understood by those skilled in the art that various changes in form and details may be made therein without departing from the spirit and scope of the invention.

What is claimed is:

1. A tape spool cassette tape player, a frame having a stationary cassette receiver means with an open face for receiving a tape-containing cassette in a cassette movement axially of a spool in such cassette, a stationary bottom wall platform with an aperture in said means, an operating member movable to and from a tape-engaging position for selective operation with tape in a cassette, and means stationarily mounted on the frame and having selectively rotatable tape spool driving means extending into said cassette receiver means for drivingly engaging a spool in a cassette inserted axially of the spool into the cassette receiver means for transporting the tape past the operating member, the improvement including the combination:

a main pivot member having a main povpt axis;

first linkage means operatively connecting said main pivot member and said operating member such that said operating member moves between tape-engaging and tape-releasing positions in accordance with corresponding pivoting movements of said main pivot member between first and second positions, respectively;

cassette-engaging means movable through said platform aperture between loading and operating positions, said loading position being in said receiver means and said operating position being outside said receiver means;

second linkage means operatively connecting said cassette-engaging means and said main pivot member including a lost motion in such operative connection such that a given movement of said main pivot member toward said second position effects cassette movement by moving said engaging means from said operating to said loading position only after a predetermined movement of said main pivot member and correspondingly; when a cassette is to be loaded, said cassette contacting said cassette engaging means and moving same from said loading position toward said operating position, said second linkage means imparting motion to said main pivot member for actuating same from said second position toward said first position after said second linkage means has traversed said lost motion and to move said operating member into said tape-engaging position;

first spring means operatively connected to one of said linkage means for urging said main pivot member and said linkage means to one of said positions; and third linkage means including ejection actuating means and connected to said main pivot member for actuating same from said first position toward said second position thereby actuating both said first and second linkage means to respectively move said operating member to said released position and said engaging means toward said loading position.

2. The player as set forth in claim 1 wherein said main pivot member is axially elongated and includes a radially outwardly extending portion coaxial of said main pivot axis and a radially inwardly extending follower surface on one axial end portion of said main pivot member adjacent said second linkage means and a locking shoulder abutting said follower surface, said second linkage means including an elongated arm movable between first and second positions and pivotally related to said main pivot member adjacent said radially outwardly extending portion and operative to determine motion of said main pivot member between first and second positions including a lost motion of said second linkage means therebetween in both directions of motion, a cam follower on one end portion of said elongated arm operatively engaging said main pivot member locking shoulder and pivotable therefrom for movably engaging said follower surface for selectively releasing said main pivot member to pivot toward said operating position, second spring means connected to said elongated arm of said second linkage means for yieldably biasing same toward said second position operative to move said elongated arm between said first and second positions upon pivoting of said main pivot member, and said first spring means connected between said third linkage means and said frame for yieldably urging said third linkage means and said main pivot member in opposition to said second spring means such that said main pivot member has two stable spring-urged positions.

3. The apparatus set forth in claim 2 wherein said cassette-engaging means includes two spaced-apart, cassette-ejecting portions movable along said frame for selectively ejecting said cassette and being responsive thereto to operate said second linkage means whenever a cassette is inserted and further including cassette holddown means yieldably biased to a cassette-released position adapted to engage and releasably hold a cassette whenever said cassette-engaging means is in said operating position and cam means intermediate said cassette-engaging means and said frame forcing engagement between said holding means and said cassette whenever said cassette-engaging means is in said operating position.

4. The subject matter set forth in claim 1 wherein said second linkage means includes a pair of said second spring means and said elongated pivotally mounted arms pivotally mounting said cassette-engaging members, each said elongated arm being independently yieldably biased by the respective second spring means toward said second position, respectively, and each elongated arm having a bifurcated end portion extending toward said main pivot member, one portion of each said bifurcated end portions being a cam follower;

said main pivot member radially enlarged portion including two cam wheels coaxial of said main pivot member on opposite ends thereof having a release shoulder with an adjacent dwell surface facing said one portion, respectively, each dwell surface having an increasing radius extending from said shoulders, respectively;

said main pivot member pivoting from said second position permitting said camming surfaces to slide over one of said dwell surfaces until reaching said release shoulder for permitting pivoting of said elongated arms to eject a cassette and in moving from a second to a first position, being responsive to pivoting of said elongated members only after said cam followers pass over said release shoulders thereby providing lost motion between cassette insertion and actuation of said main pivot member, said spring means including a pair of springs extending between said frame and one end of each of said elongated members, respectively; and said main pivot axis extending somewhat parallel to tape transport in the vicinity of said operating members.

5. The subject matter set forth in claim 4 wherein said operating member is pivotally mounted on said frame about an axis parallel to said main pivot axis and said first linkage means comprising a pair of radial arms respectively pivotally disposed about one of said axes and a connecting rod operatively engaging said radial arms for respective pivoting movements in both directions.

6. The apparatus set forth in claim 5 wherein said operating member includes a magnetic transducer fixedly secured thereto.

7. The apparatus set forth in claim 6 wherein said operating member further includes a pinch roller rotatably mounted thereon in juxtaposition to said transducer such that both said transducer and said pinch roller are pivoted simultaneously to and from said tape-engaging position.

8. The subject matter set forth in claim 3 wherein said holddown means consists of two facing upstanding members extending from said platform toward said receiver open face, respectively, integrally formed on said ejection portions and disposed outwardly thereof with respect to said cassette receiver means with facing catch means extending toward each other for selective engagement with a cassette, said upstanding members being resiliently outwardly biased away from said platform for selectively releasing the cassette, and said cam means on said frame consisting of a pair of facing surfaces extending in diverging relationship from said platform toward said open face such that as said tape-engaging means are lowered by cassette insertion, said cassette-holddown catch means are moved toward each other for engaging and releasably holding said cassette.

9. The subject matter of claim 1 wherein all pivoting action of said main pivot member and said linkages are about parallel extending axes.

10. The subject matter set forth in claim 2 wherein said cassette-engaging means includes two cassette-retaining catches disposed on opposite ends of said frame and yieldably biased outwardly to a cassette-disengaged position and operated by said second linkage means to a cassette-engaging position in response to insertion of a cassette.

11. The subject matter set forth in claim 10 wherein said third linkage means comprises an eccentric fixedly secured to said main pivot member for pivoting motions therewith and including an eccentric pin extending parallel to said main pivot member engaged by said push button.

12. The subject matter set forth in claim 1 wherein said platform is longitudinally elongated, said cassette-engaging means including an ejection member mounted on said second linkage means for reciprocating motion through said aperture, and cassette-holddown means in said cassette-engaging means disposed at opposite longitudinal ends of said cassette receiving means for reciprocating motion with said ejection member and each said cassette-holddown means being resiliently biased outwardly of said aperture to a cassette-released positon and respectively engaging opposite walls of said cassette receiving means during cassette-engaging and inward motions to releasably engage a cassette and being in said cassette-released position when at an outward end of the reciprocating motion.

13. The subject matter of claim 12 wherein said player has a pair of upstanding spindles extending through said platform for operative engagement with a cassette, the improvement further including the combination:

each said spindle extending upwardly beyond said holddown means cassette-released position whereby said spindles guide a cassette into said well before said holddown means are actuated to engage such cassette by insertion thereof.

14. A cassette player having stationary platform means for receiving and supporting a received tape-containing cassette axially of a spool in a cassette and having an aperture, a transducer for operating with the tape, and means for selectively transporting the tape past the transducer;

the improvement including the combination:

a main pivot member mounted in said player for pivoting action about an axis extending along its length, said axis being adjacent said transducer and extending substantially parallel to tape transport direction past said transducer, and having cam means coaxial thereof;

first means on said player mounting said transducer for pivoting therewith and operatively connected to said member for movements therewith;

second means movably mounted on said player and having an ejector member movable through said aperture, said ejector member responsive to a cassette being placed on said receiving platform means to actuate said second means to engage said cam means for effecting a first movement which pivots said main pivot member in a first sense for moving said transducer into transducing engagement with the tape;

release means actuated by said first movement of said main pivot member to an actuable position and operative when actuated to pivot said main pivot member in a second sense for moving said transducer away from the tape; and said cam means on said main pivot member engaging said second means for effecting a second movement of said ejector member past said platform means to eject a cassette after said main pivot member has pivoted in said second sense a predetermined amount after a first movement, all motions in said first sense being a single-stroke cassette insertion and in a second sense being a single-stroke actuation of cassette ejection.

15. The player set forth in claim 14 further including a pair of oppositely acting spring means engaged respectively to different ones of said means for urging said main pivot member to two stable positions, respectively.

16. A cassette player with a frame having a cassette-receiving platform in a housing with a pair of apertures along opposite end portions thereof, transducer means for operating with the tape, and means for effecting relative motions between said transducer and said tape;

the improvement including cassette-retaining and ejection means, in combination:

a pair of resilient cassette-retaining members movably disposed on said frame between holddown and ejection positions respectively through said apertures and including facing catch means projecting toward each other and each including an oppositely facing camming surface, said resiliency yieldably biasing said cassette-retaining members apart beyond the extent of said platform;

said platform including a pair of facing upstanding portions disposed immediately adjacent and outwardly of said apertures and including facing camming surfaces for operative engagement with same camming surfaces on said retaining members, respectively, for urging same into the extent of said platform for retaining a cassette;

said facing camming surfaces diverging away from said platform such that as said retaining member is moved toward said platform said retaining members are simultaneously cammed inwardly, and movement away from said platform said retaining members diverge for releasing the cassette from said platform; and an ejection member integrally formed with said cassette-retaining members for movement with said retaining members.

17. The apparatus set forth in claim 16 further including a main pivot member pivotally secured in said player for pivoting movement between first and second positions corresponding respectively to holddown and ejection positions of said retaining members, tape-engaging means pivotally secured on said platform for movement between tape-engaging and disengaged positions corresponding respectively to said holddown and ejection positions, first linkage means operatively connecting said main pivot member and said tape-engaging member for coordinated movements such that as said main pivot member pivots, both said tape-engaging member and said retaining members move between said corresponding positions, and second linkage means operatively connecting said main pivot member to said retention members including lost motion means for requiring a given motion of said main pivot member before actuating said retaining members to said ejection position and correspondingly requiring a given lost motion of said retaining members before actuating said main pivot member in a movement opposite to said given motion.

18. The apparatus set forth in claim 17 further including release-actuating means operatively connected to said main pivot member for causing motion between first and second positions corresponding respectively to said holddown and ejection positions for ejecting any cassette being retained by said retaining members and substantially simultaneously pivoting said tape-engaging member from said tape engaging toward said disengaged position and said lost motion means permitting said tape-engaging means to move before said cassette is ejected.

19. The apparatus set forth in claim 18 wherein said main pivot member and said tape-engaging member have pivot axes in parallel, spaced-apart relationship and a pair of elongated arms connecting said retention members and said main pivot member including a radial outward engagement with respect to said main pivot member whereby the pivoting action is translated in direct linear motion, the radial engagement including a cam having a given cam surface with said lost motion caused by dwell portions thereon.

20. The apparatus set forth in claim 19 wherein said main pivot member is elongated along its axis of pivoting and disposed parallel and in juxtaposition to said platform and said elongated arms being disposed transverse to said main pivot member length and being in operative engagement to said main pivot member at the longitudinal extremities thereof, a pair of spring members connecting said elongated arms to said frame for urging same to eject said cassette, detent means on both said extremities for holding said arms against spring-urged pivoting for locking engagement in said second position of said main pivot member, said push button operative to actuate said main pivot member for pivoting toward said first position to release said elongated members from said locking engagement for pivoting under said spring urging.

21. The apparatus set forth in claim 19 wherein said cassette-engaging means comprises a pair of block portions fixedly associated with said retention members and extending inwardly thereof for respectively engaging opposite longitudinal ends of the cassette on said platform, said ends extending transverse to the length of said cassette and responsive to a cassette being inserted for moving said elongated arms and hence pivoting said main pivot member for storing energy in said pair of spring members prior to cassette ejection.

22. A cassette tape player having a head movably mounted on a frame for movements between tape engaging and disengaging positions, a stationary cassette-receiving rectangularly shaped well on a player frame, the improvement including in combination:

retaining means mounted on said frame for movements between operating and cassette-disengaged positions, when in said operating position releasably retaining a cassette in an operating position in said well with respect to said head when said head is in said tape-engaging position and said means when in said cassette-disengaged position being disengaged from such cassette for releasing same for ejection from said well, cassette-ejection means on said frame movable between an operating position out of said well and a loading position inside said well along a path transverse to the cassette rectangular extent, and means on said frame for moving said head between said tape engaging and disengaged positions substantially cojointly with movements of said ejection means respectively between said operating and loading positions and substantially simultaneously moving said retaining means respectively between said operating and cassette-disengaged positions.

23. The subject matter of claim 22 wherein said moving means operates in a single continuous stroke in both directions of motion between said engaging and disengaged positions and includes means operatively connecting said movable head with said cassette ejection and retaining means and having lost motion during each said moving means single continuous stroke for time spacing head movements and with respect to movements of said cassette ejection and retaining means.

24. The subject matter of claim 23 wherein said retaining and moving means having pivotable connecting members each with a given pivot axis, said single continuous stroke includes pivoting of said plural connecting members between first and second positions corresponding to said tape engaging and tape disengaged positions respectively and all pivot axes thereof being parallel.

25. The subject matter of claim 24 further including a push button actuable from a first to a second position, a main pivoting member operatively connected thereto to all members for moving same to said second position by one-stroke actuation of said push button to eject a cassette means locking said members in said second position and operatively connected to said retaining means, spring means yieldably urging said push button and said members to said first position such that when a cassette being inserted engages said retaining means releasing said locking means permitting said spring means to urge said push button toward said first position from said second position.

26. The subject matter of claim 25 wherein the cassette is loaded broadside and said player has at least one upstanding guide centrally of said well and extending beyond said retaining means out of said well when said retaining means is in said loading position.

27. A cassette player, a head movable between operating and tape-disengaged positions, a stationary slightly elongated rectangular cassette-receiving platform, tape transport means on said stationary platform adapted to move tape in a cassette past the head, a pair of resilient cassette holddowns disposed at opposite longitudinal ends of said stationary platform and movable toward said platform to an operating or cassette-holding position and said holddowns being shaped such that the resiliency thereof continuously yieldably biasing said holddowns away from said platform to a cassette-release position corresponding to said tape-disengaged position, and means mounted on and movable with respect to said platform in response to a cassette being inserted to move said holddowns and said head to said operating positions substantially simultaneously to the cassette reaching said platform for operating with said head in said operating position.

28. A cassette player having a stationary slightly elongated rectangular cassette-receiving platform for supporting a cassette in an operative position, an operating member movably mounted on said platform for operating with a tape in a cassette when the member is in an operating position on the platform, and said member being movable to a disengaged or another position;

a pair of cassette-retaining members movably mounted on opposite longitudinal ends of said platform and resiliently biased outwardly of said platform, each retaining member having a catch projecting inwardly toward said platform for releasably holding a cassette on said platform when in an operating position and movable to another position;

first means responsive to a cassette moving toward said platform to move said operating member into tape engagement and substantially simultaneously move said cassette-retaining members to releasably hold such cassette; and a release actuator mounted on said platform and movable between an operating position and another position and operatively mechanically connected to said first means for actuating same to substantially simultaneously release said cassette-retaining members from such cassette when said actuator is in said another position while said cassette is in juxtaposition to said platform and said actuator simultaneously moving said operating member to said another position.

29. The subject matter of claim 28 wherein said first means comprises a shoe movably mounted on said platform;

a main pivot member connected to all said members, said actuator and said shoe, and pivotal between first and second positions such that said members are in said operating positions and another position respectively as said main pivot member pivots between said first and second positions.

30. The player set forth in claim 28 further including:

first spring means yieldably urging said first means to eject a cassette from said platform, second spring means yieldably urging said release actuator and said operating member to said operating position, and a pair of releasable detents in said first means for limiting stable positions of said first means to cassette operating and release positions under urging of said spring means, respectively.

* * * * *